United States Patent
Traylor et al.

(10) Patent No.: US 6,327,313 B1
(45) Date of Patent: Dec. 4, 2001

(54) METHOD AND APPARATUS FOR DC OFFSET CORRECTION

(75) Inventors: Kevin B. Traylor; Jing Fang, both of Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/473,673

(22) Filed: Dec. 29, 1999

(51) Int. Cl.[7] .............................. H03K 9/00; H04L 27/06; H04L 27/14; H04L 27/22
(52) U.S. Cl. ............................................................ 375/316
(58) Field of Search ...................................... 375/316, 340, 375/346, 354, 371, 318, 317; 329/306, 300; 341/110, 155, 144

(56) References Cited

U.S. PATENT DOCUMENTS

| | | | |
|---|---|---|---|
| 4,250,458 | * 2/1981 | Richmond et al. | 329/306 |
| 4,887,299 | * 12/1989 | Cummins et al. | 381/317 |
| 5,182,476 | * 1/1993 | Hanna et al. | 327/362 |
| 5,430,765 | * 7/1995 | Nagahori | 375/318 |
| 5,459,679 | * 10/1995 | Ziperovich | 708/3 |
| 5,652,541 | * 7/1997 | Yang et al. | 329/300 |
| 5,675,287 | * 10/1997 | Baker et al. | 330/129 |
| 5,774,085 | * 6/1998 | Yanagimoto et al. | 341/155 |
| 5,815,581 | * 9/1998 | Andersson | 381/321 |
| 5,875,157 | * 2/1999 | Sasaki et al. | 369/44.29 |
| 5,878,091 | * 3/1999 | Retzer | 375/340 |
| 6,038,266 | * 3/2000 | Lee et al. | 375/317 |

\* cited by examiner

*Primary Examiner*—Stephen Chin
*Assistant Examiner*—Lenny Jiang
(74) *Attorney, Agent, or Firm*—Barbara R. Doutre; Randall S. Vaas

(57) ABSTRACT

A DC offset correction loop (200, 300) utilizes a peak estimator (218, 322) to determine peaks associated with a digital signal (238, 338). The peak estimator (218, 322) averages the peaks in order to estimate the DC offset. A summer (216, 326) sums the DC offset (242, 350) with the digital signal to produce a corrected output.

36 Claims, 4 Drawing Sheets

METHOD AND APPARATUS FOR DC OFFSET CORRECTION

TECHNICAL FIELD

This invention relates to techniques and apparatus for minimizing DC offsets in electronic circuits.

BACKGROUND

Traditional superheterodyne receivers translate incoming radio signals to one or more intermediate frequencies where successive stages of amplification, baseband filtering and gain control are applied. Direct conversion architecture uses a single mixer with a single oscillator tuned to the desired signal frequency, converting a signal directly to baseband- the zero intermediate frequency "ZIF" signal. Direct conversion receivers have been gaining in popularity in the electronic communications environment.

DC offset correction is one of the most critical problems in the design of direct conversion receivers. FIG. 1 is a block diagram of a conventional DC offset correction loop 100 such as would be used in the baseband path of a direct conversion receiver, cell phone, or other communication device. Correction loop 100 is shown coupled to a mixer 102 and generally includes a summer 104, a baseband filter 106, an attenuator 108, an integrator 110, and an operational transconductance amplifier (OTA) 112. In operation, mixer 102 receives a radio frequency (RF) signal 114 and a second radio signal, such as a local oscillator (LO) signal. The output of the mixer is a zero IF (ZIF) signal which gets corrected by adding or subtracting it with a feedback signal 116 to produce a baseband signal 118. The baseband signal 118 is filtered through the baseband filter 106 to produce an I and Q output signal 120. The I and Q output signal 120 is attenuated through attenuator 108, and the attenuated signal 122 is then integrated through integrator 110 to produce the feedback signal 124 (Ioffset, Qoffset). The output of the correction loop 100 is taken at the output of the baseband filter 120.

Mismatches between devices in a direct conversion radio system create DC offset in the down mixer and baseband filter. This offset can introduce tremendous distortion in the FM demodulation and even make the baseband filter non-functional. In the analog-to-digital conversion processes that occur in digital circuits, the DC offset is converted to a digital input along with I/Q data. During the A/D conversion process the offsets can also saturate the A/D converters.

Slow varying offsets create even more difficulties for DC offset correction. Traditionally, the integrator 110 has included a programmable time constant that is used to remove DC offsets after baseband filtering. However, since the integrator 110 has an infinite gain at DC, the delay introduced is so long that DC estimations cannot quickly follow the actual slow varying DC. As a consequence, the demodulated signal is severely distorted.

Other approaches to DC offset correction include quantization schemes and least mean square (LMS) techniques. However, these methods tend to require heavy computational steps in order to achieve any significant improvement in performance reduction in the DC offset.

Accordingly, there is a need for an improved method and apparatus for correcting DC offsets, particularly those offsets which occur in zero IF and direct conversion receivers.

DESCRIPTION OF THE PREFERRED EMBODIMENT

Figure 1:
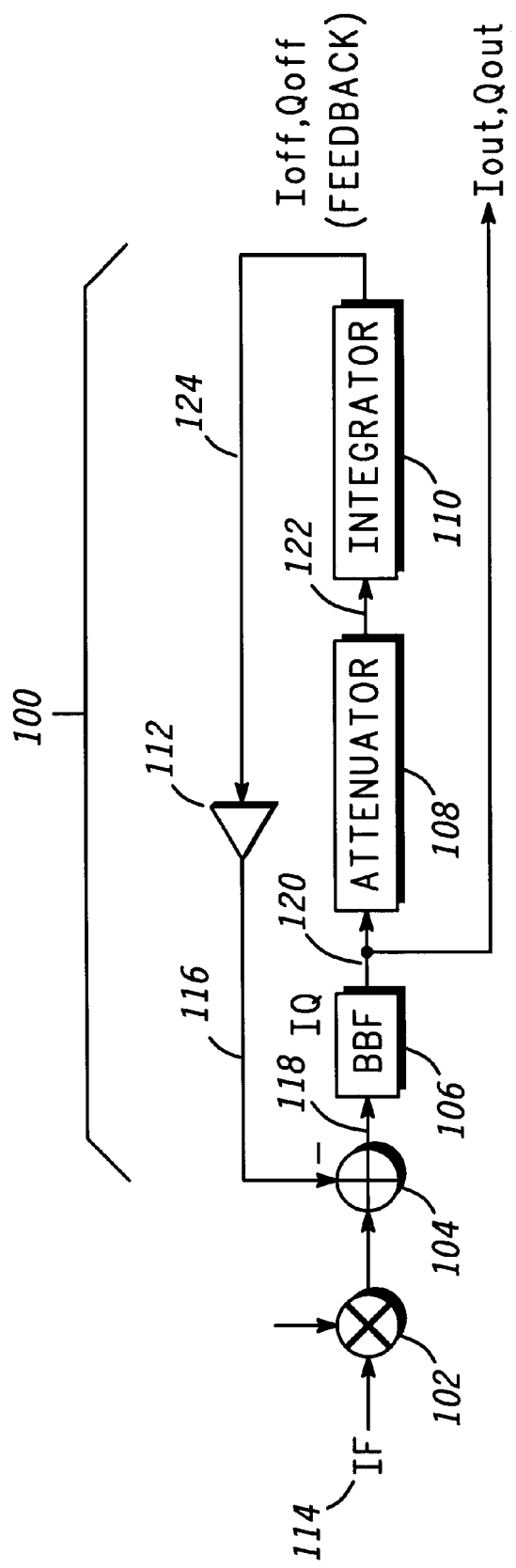
FIG. 1 is a block diagram of a prior art DC offset correction loop.

While the specification concludes with claims defining the features of the invention that are regarded as novel, it is believed that the invention will be better understood from a consideration of the following description in conjunction with the drawing figures.

Briefly, in accordance with the present invention a DC offset correction loop incorporates a peak estimator into the loop for receiving a digital signal (I/Q signal). The peak estimator determines peaks associated with the I/Q signal and averages the peaks in order to estimate the DC offset. A summer then sums the DC offset with the I/Q signal to produce a corrected output for the loop. The peak estimator is shown and described herein as part of two DC correction loop embodiments. Also, in accordance with the present invention, corresponding peak estimation techniques provided herein offer a method of receiving a digital signal, estimating the peaks of the digital signal, averaging the peaks of the digital signal to estimate the DC offset, and correcting for the DC offset by summing the DC offset with the digital signal.

Figure 2:
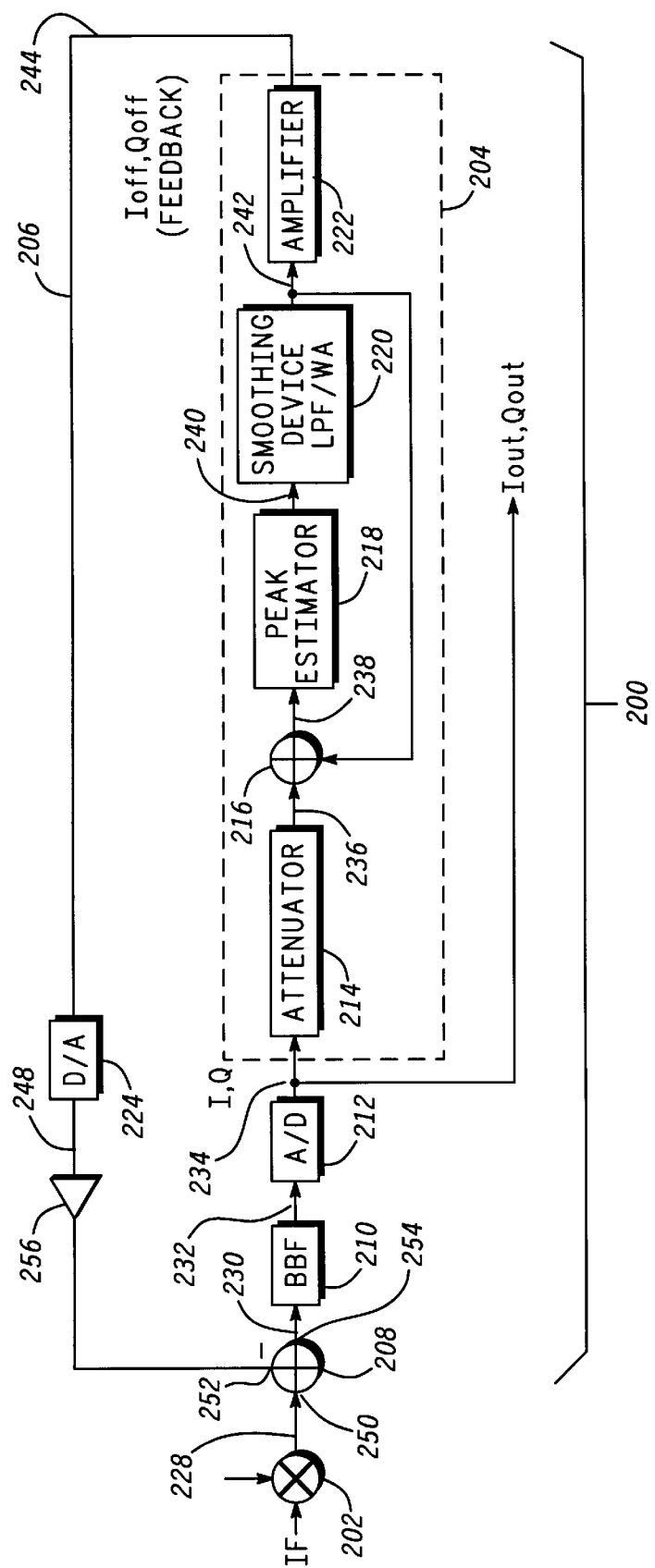
FIG. 2 is a block diagram of a DC offset correction loop in accordance with a first embodiment of the present invention.

FIG. 2 is a block diagram of a receiver incorporating a DC offset correction loop 200 in accordance with a first embodiment of the present invention. The receiver includes a mixer 202 for mixing two radio signals (e.g. RF and LO) and producing a zero intermediate frequency (ZIF) signal 228. Offset correction loop 200 includes a negative regenerative feedback loop having two feedback portions 204, 206. In accordance with the first embodiment, the first feedback portion 204 includes an attenuator 214, a summer 216, a peak estimator 218, a smoothing device 220, and an amplifier 222. The second feedback portion 206 incorporates the first feedback portion 204 between two converters, A/D 212 and D/A 224, and further includes a second summer 208, an OTA 256, and baseband filter 210.

The signal flow for the DC offset correction loop 200 begins with the first summer 208 having first and second inputs 250, 252, and an output 254. The first input 250 receives the zero intermediate frequency (ZIF) signal 228 and sums it with an estimated analog DC offset signal 248 to produce an corrected ZIF signal 230. A baseband filter 210 coupled to the output 254 of the first summer 208 filters the corrected ZIF signal into a filtered signal 232. The analog-to-digital converter(A/D)212 converts the filtered signal 232 into a digital I/Q signal 234. The attenuator 214 receives the digital signal 234 and generates an attenuated digital signal 236. The second summer 216 sums the attenuated signal 236 with an I/Q offset output signal 242 to generate a ZIF equivalent digital signal 238.

In accordance with the present invention, a peak estimator 218 digitally estimates the peaks of the ZIF equivalent digital signal 238 and calculates DC offsets. The smoothing device 220 interpolates the estimated DC offsets 240 and produces the I/Q offset output signal 242. The I/Q offset output signal 242 is fed back to the second summer 216 (as part of the inner feedback loop). The amplifier 222 amplifies the I/Q offset output signal 242. A digital-to-analog (D/A) converter 224 converts the amplified I/Q offset output signal 244 to an analog offset signal 248. The analog offset signal 248 is fed back (via OTA 256) to the second input 252 of the first summer 208 (outer feedback loop). The digital signal 234 generated from the A/D converter 212 provides an output of the DC offset correction loop 200.

It should be noted that certain functions such as the attenuation function, can be integrated/incorporated within other devices, such as the smoothing device 220 or amplifier 222. Likewise, the amplification function 222 can also be performed as part of the smoothing function. The smoothing function 220 is preferably implemented with a low pass filter and weighted accumulator. While the digital embodiment has been described there are potential applications that could tap the loop output off of the analog point at the output of the baseband filter 210 if desired. A predictor device (not shown) can be added between the peak estimator 218 and smoothing device 220, if desired, to predict DC offsets via polynomial functions or curve fitting functions to provide improved accuracy and speed.

The DC offset correction loop 200 provides the advantages of improved accuracy of DC offset estimations. Shorter estimation time (real time), as compared to conventional correction loops, is another added benefit. The DC offset correction loop 200 is useful for low cost applications in that the estimator device can be implemented within existing controller circuitry thereby minimizing hardware.

Though shown and described in terms of a digital system 200, the peak estimator function also provides improved offset correction in analog systems as well. Basically, the A/D and D/A converters are removed from FIG. 2 to roughly create an analog system. The peak estimator 218 is then implemented with capacitor(s) as opposed to the envelope estimation used in the digital system (described herein).

Additionally, system 200 can also operate without the embedded feedback path by removing (shorting across) summer 216. Though this would be a coarser DC offset estimation than that already shown and described, the system still outperforms conventional DC offset correction.

Figure 3:
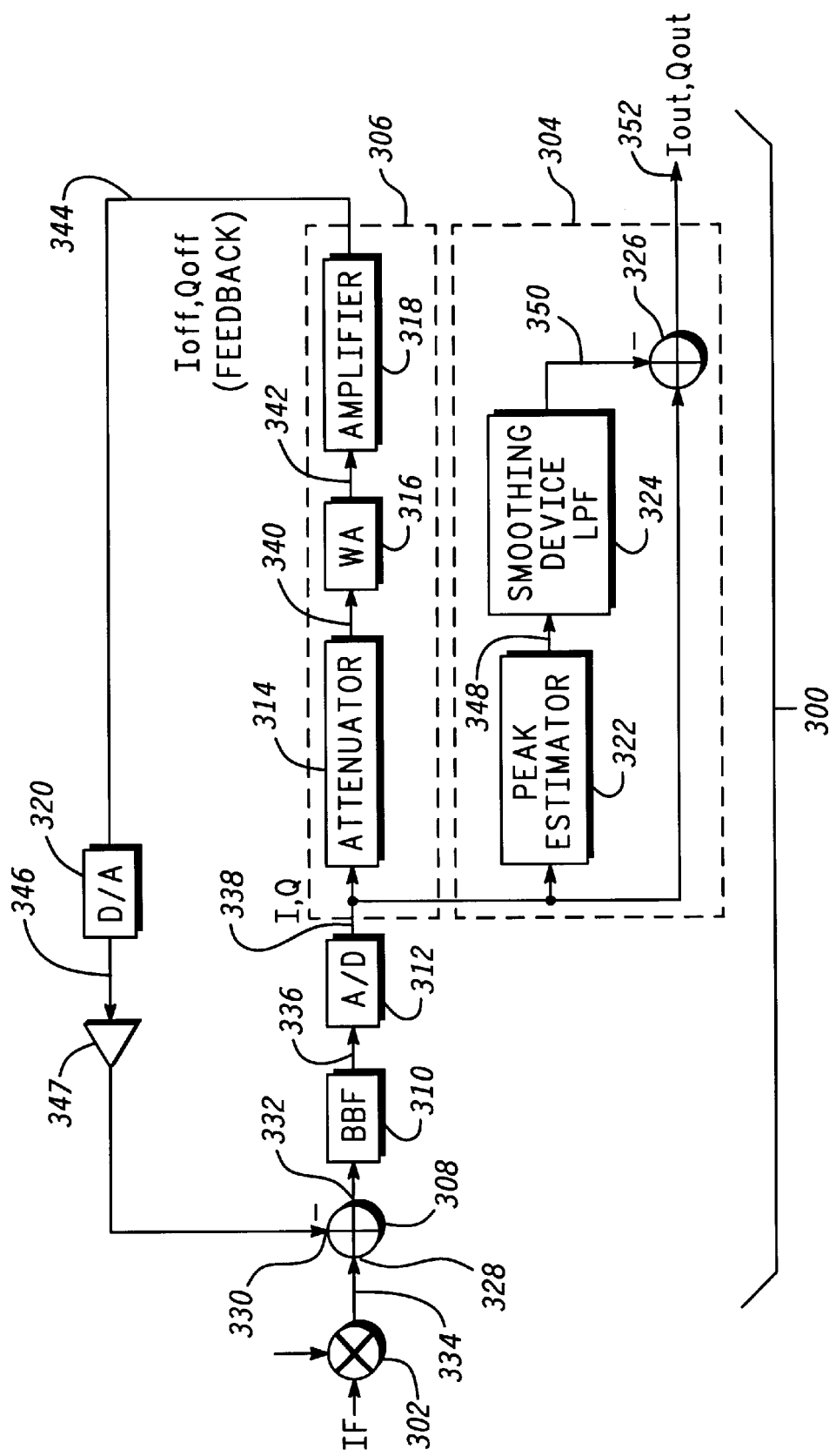
FIG. 3 is a block diagram of a DC offset correction loop in accordance with a second embodiment of the invention.

Referring now to FIG. 3 there is shown a receiver incorporating a DC offset correction loop in accordance with a second embodiment of the invention. Mixer 302 mixes two radio signals into a ZIF signal 334. The DC offset correction loop 300 includes a first summer 308 having first and second inputs 328, 330 and an output 332, the first input 328 receives the ZIF signal 334 while the second input receives DC offsets that have been calculated in a manner to be described herein. A corrected ZIF signal is generated at an output 332 of the summer 308. A baseband filter 310 filters the corrected ZIF signal into a filtered signal 336 and an analog-to-digital (A/D) converter 312 converts the filtered signal into a digital I/Q signal 338. An attenuator 314 receives the digital I/Q signal 338 and generates an attenuated digital signal 340. A weighted accumulator 316 receives the attenuated digital signal 340 and produces a first I/Q offset output signal 342. An amplifier 318 amplifies the first I/Q offset output signal 342 and produces an amplified I/Q offset signal 344. A digital-to-analog (D/A) converter 320 converts the amplified I/Q offset signal 344 into an analog offset signal 346 which gets fed back (via OTA 347) to the second input 330 of the first summer 308.

In accordance with the present invention, a peak estimator 322 digitally estimates the peaks of the digital I/Q signal 338 and calculates DC offset residue. A smoothing device 324 then interpolates the estimated DC offset residue 348 and produces a second I/Q offset output signal 350. A second summer 326 sums the digital I/Q signal 338 and the second I/Q offset output signal 350 to generate an output 352 (Iout,Qout) for the DC offset correction loop 300.

The DC offset correction loop 300 of the second embodiment can be viewed as having a regenerative feedback loop 306 and a peak estimator loop 304 tapped off of the regenerative loop. The negative regenerative feedback loop 306 includes the attenuator 314 for receiving I/Q signal 338 and generating the attenuated signal 340, the weighted accumulator 316 for estimating DC offset in the attenuated signal 340, and the amplifier 318 for scaling the estimated DC offset 342. The attenuator 314 can, alternatively, be incorporated within the weighted accumulator 316 or the amplifier 318. The negative regenerative feedback loop 306 provides coarse adjustment for the DC offset correction loop 300.

In accordance with the second embodiment, the peak estimator output loop 304 receives the digital I,Q signal and splits it into two paths. One path estimates the peaks of the I/Q signal 338, calculates DC residue and then smoothes and interpolates the DC residue. The second path takes the I/Q signal 338 and sums it with the DC residue 350 at summer 326. Again, the output of summer 326 is preferably used as the output of the DC correction loop 300. The peak estimator output loop 304 provides fine adjustment of the DC offset in correction loop 300 while the regenerative feedback loop 306 provides the coarse adjustment.

A predictor device (not shown) can also be added between the peak estimator 322 and the smoothing device 324 for predicting DC offsets based on polynomial functions and curve fitting equations. Alternatively, a delay device can also be at the second input of the summer 326 for improved alignment and cancellation. The DC offset correction loop 300 provides the advantages of simplicity of implementation, and improved stability.

In accordance with the present invention, adding peak estimation into the DC offset correction loop improves the estimation accuracy without sacrificing hardware simplicity. A variety of peak estimation techniques can be used with the preferred peak estimation techniques being described herein.

To simplify the analysis, a FM received signal at baseband can be written as $$I=A \sin (k\int x(t)dt)+Idc \quad (1)$$
$$Q=A \cos (k\int x(t)dt)+Qdc.$$

where A is carrier strength, X(t) represents a modulating signal, k is the modulation index, and Idc/Qdc is the DC offset in I/Q channel, respectively. The maxima and minima of I and Q can be expressed by $$Imax = A + Idc \quad Qmax = A + Qdc \quad (2)$$
$$Imin = -A + Idc \quad Qmax = A - Qdc.$$

Thus, the DC offset and the amplitude can be estimated by $$Idc = \frac{Imax + Imin}{2} \quad Qdc = \frac{Qmax + Qmin}{2} \quad (3)$$
$$A = \frac{Imax - Imin}{2} \quad A = \frac{Qmax - Qmin}{2}.$$

Because the DC offsets can be estimated accurately only at peaks, an interpolation, with or without a prediction, is used for estimation at other time instances.

Not every extreme of I/Q will provide the result of Equation 3. Peaks can also be created when the modulating signal x(t) is zero because $$\frac{dI}{dt} = A\cos\left(\int x(t)dt\right)x(t) \quad (4)$$

$$\frac{dQ}{dt} = -A\sin\left(\int x(t)dt\right)x(t).$$

Criteria for valid peak determination are needed particularly when the carrier is varying and noise is present. For example, peak can be determined by thresholding on amplitude of the derivative of I and Q, and/or by comparing relative amplitude values of I and Q at extreme points.

In accordance with the invention, two examples of peak estimation techniques follow—envelope estimation and a block processing estimation. Either estimation method can be used to provide peak estimation and each provides the option of "fixed" and "adaptive" attributes.

In accordance with the invention, the envelop estimation is determined by performing the steps of determining peak values in the digital signal; updating the peak values when the digital signal exceeds current peak values; adjusting the peak value resulting in an instantaneous positive peak or an instantaneous negative peak; and estimating the DC offset by averaging the instantaneous positive and negative peaks.

In accordance with the invention, the envelope estimation can be fixed or adaptive. If the step of adjusting is performed by increasing or decreasing the peak value by a predetermined step the estimation is considered fixed. If the step of adjusting is performed by increasing or decreasing the peak value based on an adaptive step then the system is considered adaptive.

The second peak estimation technique utilizes block processing. Fixed block processing is performed by performing order statistics filtering on a fixed window size to produce decimated signals; extracting local positive and negative peaks from the decimated signals; and estimating DC offsets by averaging the local positive and negative peaks. Alternatively, the fixed block processing can be performed by adding the step of extracting local positive and negative peaks from the decimated signals; and then determining the global positive and negative peaks using the local positive and negative peaks; and estimating DC offsets by averaging the global positive and negative peaks.

The adaptive block processing of peak estimations is preferably performed by estimating the frequency of the I and Q signals in order to determine a window size; performing order statistics filtering on the determined window size to produce decimated signals; and extracting local positive and negative peaks from the decimated signals. The DC offsets are then determined by averaging the local positive and negative peaks.

Alternatively, the adaptive block processing of peak estimations can be performed by adding the step of extracting local positive and negative peaks from the decimated signals; and then determining global positive and negative peaks using the local positive and negative peaks. The DC offsets are then estimated by averaging the global positive and negative peaks.

The step of determining global positive and negative peaks (in either the fixed or adaptive block processing system) may be based on variety of criteria, including but not limited to, the amplitude relationship between I and Q signals, the amplitude relationship of the decimated signals, or the derivative of the I and Q signals. Determining global positive and negative peaks can also be based on combinations of criteria such as the amplitude relationship between I and Q signals and derivatives of the I and Q signals. The basis for selecting one criteria over another is a matter of design preference, since both criteria provide flexibility, robustness, and simplified hardware/software implementation.

Figure 4:
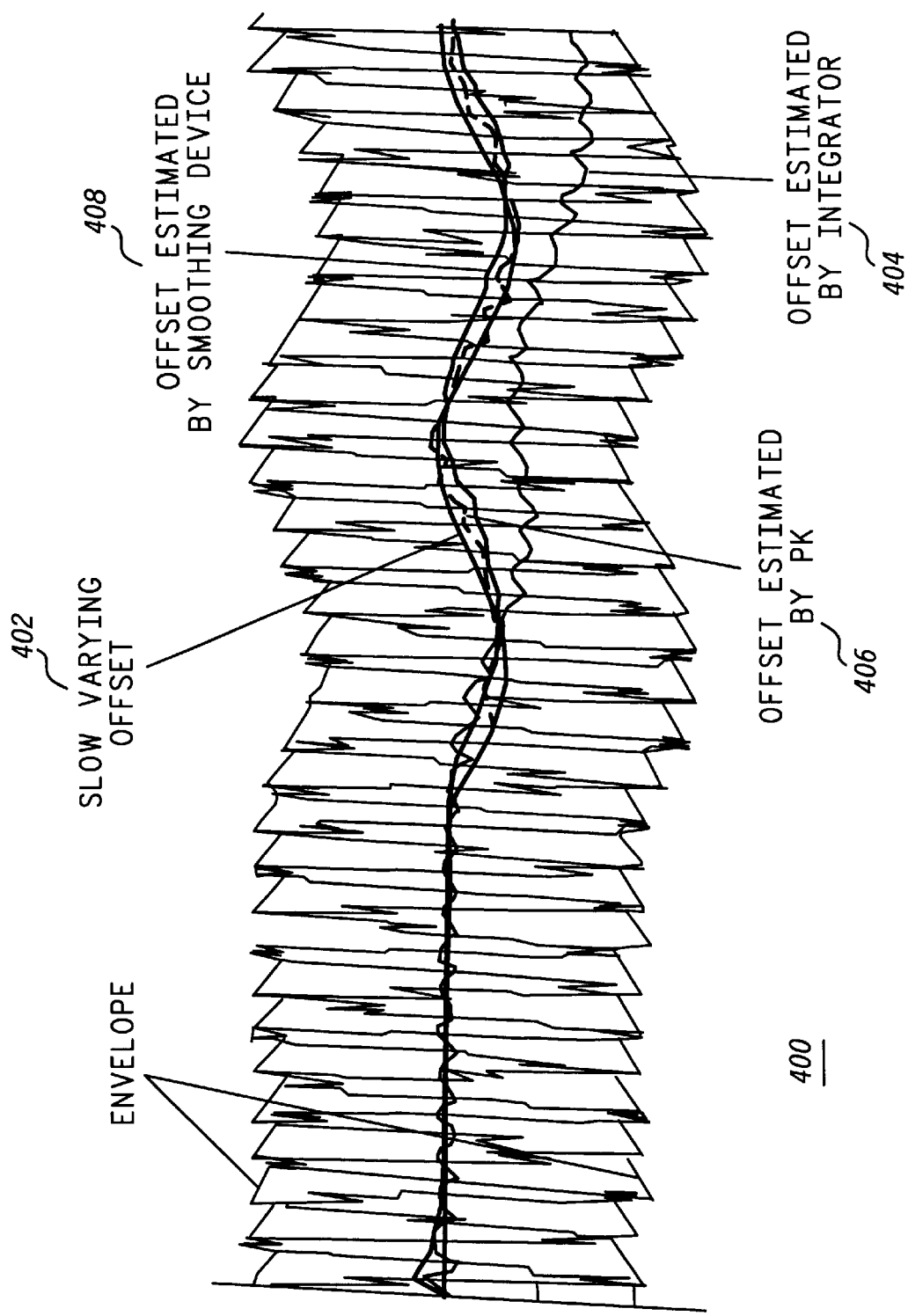
FIG. 4 is a graph comparing DC offset estimations estimated with a prior art integrator and estimated using a peak detection technique in accordance with the present invention.

FIG. 4 shows a graph 400 depicting an example of a slow varying DC offset curve 402 being compared with an offset curve 406 estimated using peak estimations in accordance with the present invention. Curve 408 represents the smoothing of the offset peak estimations 406 in accordance with the present invention, and curve 404 represents an offset that was estimated using a prior art integrator. As shown in the graph 400, improved accuracy of DC offset estimations is achieved by using the envelope estimation scheme in accordance with the present invention. Similar results occur using either the envelope estimation method or the block processing method. Many communication devices, particularly frequency modulated devices, where real time correction of DC offsets is required, can reap the advantages of improved hum and noise performance. Two-way radios, pagers, cell phones and a variety of other wireless products can all benefit from the improved DC offset correction offered by the peak estimator of the present invention. Zero IF receiver topologies will be provided with enhanced hum and noise performance and lower distortion of demodulation. The peak estimator reduces low level audio artifacts associated with DC offsets in ZIF architectures.

Accordingly, in accordance with the invention, there has been provided an improved DC offset correction loop through the inclusion of a peak estimator as part of the loop. Furthermore in accordance with the invention, peak estimation techniques have also been provided that optimize peak detection and manipulation of DC offsets. Both analog and digital systems can benefit from the use of a peak estimator provided by the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of correcting for DC offsets in a digital signal, comprising the steps of:

receiving a digital signal (an I/Q signal);

estimating the peaks of the digital signal using envelope estimation;

averaging the peaks of the digital signal to estimate the DC offset; and correcting for the DC offset by summing the DC offset with the digital signal.

2. The method of claim 1, wherein the envelope estimation is determined by performing the steps of:

determining peak values in the digital signal;

updating the peak values when the digital signal exceeds current peak values;

adjusting the peak value resulting in an instantaneous positive peak or an instantaneous negative peak; and estimating the DC offset by averaging the instantaneous positive and negative peaks.

3. The method of claim 2, wherein the step of adjusting comprises the step of increasing or decreasing the peak value by a predetermined step thereby providing a fixed envelope estimation scheme.

4. The method of claim 2, wherein the step of adjusting comprises the step of increasing or decreasing the peak value by an adaptive step thereby providing an adaptive envelope estimation scheme.

5. A method of correcting for DC offsets in a digital signal, comprising the steps of:
receiving a digital signal (an I/Q signal);
estimating the peaks of the digital signal using fixed block processing peak estimations;
averaging the peaks of the digital signal to estimate the DC offset; and
correcting for the DC offset by summing the DC offset with the digital signal.

6. The method of claim 5, wherein the fixed block processing is performed by:
performing order statistics filtering on the fixed window size to produce decimated signals;
extracting local positive and negative peaks from the decimated signals; and
estimating DC offsets by averaging the local positive and negative peaks.

7. The method of claim 5, wherein the fixed block processing is performed by:
performing order statistics filtering on the fixed window size to produce decimated signals;
extracting local positive and negative peaks from the decimated signals;
determining global positive and negative peaks using the local positive and negative peaks;
estimating DC offsets by averaging the global positive and negative peaks.

8. The method of claim 7, wherein the step of determining global positive and negative peaks is based on an amplitude relationship between I and Q signals.

9. The method of claim 7, wherein the step of determining global positive and negative peaks is based on an amplitude relationship of the decimated signals.

10. The method of claim 7, wherein the step of determining global positive and negative peaks is based on derivative of I and Q signals.

11. The method of claim 7, wherein the step of determining global positive and negative peaks is based on an amplitude relationship between I and Q signals and derivatives of the I and Q signals.

12. A method of correcting for DC offsets in a digital signal, comprising the steps of:
receiving a digital signal (an I/Q signal);
estimating the peaks of the digital signal using adaptive block processing peak estimations;
averaging the peaks of the digital signal to estimate the DC offset; and
correcting for the DC offset by summing the DC offset with the digital signal.

13. The method of claim 12, wherein the adaptive block processing of peak estimations is performed by:
estimating the frequency of the I and Q signals in order to determine a window size;
performing order statistics filtering on the determined window size to produce decimated signals;
extracting local positive and negative peaks from the decimated signals; and
estimating DC offsets by averaging the local positive and negative peaks.

14. The method of claim 12, wherein the adaptive block processing of peak estimations is performed by:
estimating the frequency of the I and Q signals in order to determine a window size;
performing order statistics filtering on the determined window size to produce decimated signals;
extracting local positive and negative peaks from the decimated signals;
determining global positive and negative peaks using the local positive and negative peaks; and
estimating DC offsets by averaging the global positive and negative peaks.

15. The method of claim 14, wherein the step of determining global positive and negative peaks is based on an amplitude relationship between I and Q signals.

16. The method of claim 14, wherein the step of determining global positive and negative peaks is based on an amplitude relationship of the decimated signals.

17. The method of claim 14, wherein the step of determining global positive and negative peaks is based derivative of I and Q signals.

18. The method of claim 14, wherein the step of determining global positive and negative peaks is based on an amplitude relationship between I and Q signals and derivatives of the I and Q signals.

19. A DC offset correction loop, comprising:
a first summer having first and second inputs and an output, the first input for receiving a zero intermediate frequency (ZIF) signal;
a baseband filter coupled to the output of the first summer, the baseband filter for filtering the ZIF signal into a filtered signal;
an analog-to-digital converter (A/D) for converting the filtered signal into a digital signal;
an attenuator for receiving the digital signal and generating an attenuated digital signal;
a second summer for summing the attenuated signal and an I/Q offset output signal and generating a ZIF equivalent digital signal;
a peak estimator for digitally estimating the peaks of the ZIF equivalent digital signal and calculating DC offsets;
a smoothing device for interpolating the estimated DC offsets and producing the I/Q offset output signal, the I/Q offset output signal being fed back to the second summer;
an amplifier for amplifying the I/Q offset output signal;
a digital-to-analog (D/A) converter for converting the I/Q offset output signal to an analog offset signal, the analog offset signal being fed back to the second input of the first summer; and
the digital signal generated from the A/D converter providing an output of the DC offset correction loop.

20. The DC offset correction loop of claim 19, wherein the smoothing device comprises a lowpass filter.

21. The DC offset correction loop of claim 19, wherein the smoothing device comprises a weighted accumulator.

22. The DC offset correction loop of claim 19, further comprising a predictor between the peak estimator and the smoothing device for predicting future peaks.

23. A DC offset correction loop, comprising:
a first summer having first and second inputs and an output, the first input for receiving a zero intermediate (ZIF) signal;
a baseband filter coupled to the output of the summer, the baseband filter for filtering the ZIF signal into a filtered signal;

an analog-to-digital (A/D) converter for converting the filtered signal into a digital I/Q signal;

an attenuator for receiving the digital I/Q signal and generating an attenuated digital signal;

a weighted accumulator for receiving the attenuated digital signal and producing a first I/Q offset output signal;

an amplifier for amplifying the first I/Q offset output signal and producing an amplified I/Q offset signal;

a digital-to-analog (D/A) converter for converting the amplified I/Q offset signal into an analog offset signal, the analog offset signal being fed back to the second input of the first summer;

a peak estimator for digitally estimating the peaks of the digital I/Q signal and calculating DC offset residue;

a smoothing device for interpolating the estimated DC offset residue and producing a second I/Q offset output signal;

a second summer for summing the digital I/Q signal and the second I/Q offset output signal to generate an output for the DC offset correction loop.

24. The DC offset correction loop of claim 23, further comprising a predictor between the peak estimator and the smoothing device for predicting further peaks.

25. The DC offset correction loop of claim 23, further comprising a delay device at the input to the second summer for delaying the I/Q signal.

26. The DC offset correction loop of claim 23, wherein the smoothing device comprises a lowpass filter.

27. A method of minimizing DC offsets, comprising the steps of:

receiving a baseband signal;

converting the baseband signal to a digital signal;

summing the digital signal with previously estimated DC offsets to produce a ZIF equivalent offset signal;

digitally estimating the DC offsets in the ZIF equivalent signal;

amplifying the estimated digital DC offsets;

converting the amplified estimated digital DC offsets into an analog signal; and summing the analog signal with the received baseband signal to provide a corrected baseband signal;

repeating the steps of receiving through summing the analog signal using the corrected baseband signal.

28. The method of claim 27, wherein the step of estimating is performed using first or second peak detection criteria selected from the group of fixed envelope estimations or adaptive envelope estimations.

29. The method of claim 27, wherein the step of estimating is performed using first or second peak detection criteria selected from the group of fixed block processing peak estimations or adaptive block processing peak estimations.

30. The method of claim 27, wherein the digital signal is provided as an output.

31. The method of claim 27, further including the step of attenuating the digital signal prior to the step of summing the digital signal with the previously estimated DC offsets.

32. A digital DC offset estimation circuit, comprising:

a baseband filter for receiving a baseband signal and generating a filtered baseband signal;

an attenuator for compensating signal amplitude of the filtered baseband signal and generating a gained signal;

a peak estimator for estimating peaks of the gained signal and estimating DC offsets associated with the gained signal;

a smoothing device for smoothing and interpolating the estimated DC offsets and generating a smoothed DC offset;

an amplifier for scaling the smoothed DC offset signal and generating an amplified signal; and a summer for summing the amplified signal with the baseband signal to generate a ZIF equivalent signal.

33. A digital DC offset estimation circuit as described in claim 32, further comprising a predictor device coupled between the peak estimator and the smoothing device for estimating future peaks.

34. A digital DC offset estimation circuit, comprising:

a baseband filter for filtering the baseband signal;

a weighted accumulator for estimating DC offset in the filtered baseband signal;

an amplifier for scaling the estimated DC offset and producing a scaled signal;

a first summer for summing the scaled signal and the baseband signal;

a peak estimator for estimating peaks of the filtered baseband signal and calculating DC residue;

a lowpass filter for interpolating and smoothing the DC residue; and a second summer for canceling the DC residue of the filtered baseband signal.

35. A DC offset correction loop, including:

a negative regenerative feedback loop, including within the loop:

an attenuator for receiving an I/Q signal and generating a gain compensated waveform;

a summer having first and second inputs, the first input receiving the gain compensated waveform;

a peak estimator for estimating peaks of the gain compensated waveform and calculating DC offset; and a smoothing device for smoothing and interpolating the DC offset estimation, a smoothed DC offset being fed back to the second input of the summer; and an amplifier for scaling the smoothed DC offset and feeding it back the first summer.

36. A DC offset correction loop, including:

a negative regenerative feedback loop, including:

an attenuator for receiving an I/Q signal and generating an attenuated signal;

a weighted accumulator for estimating DC offset in the attenuated signal;

an amplifier for scaling the estimated DC offset;

an output signal path coupled to the input of the attenuator, the output signal path including:

a peak estimator for estimating peaks of the I/Q signal and calculating DC residue of the I/Q signal;

a lowpass filter for interpolating and smoothing the DC residue; and a summer for summing the DC residue of the I/Q signal with the I/Q signal to produce an I/Q output signal as the output of the DC correction loop.

* * * * *